Figure 1:
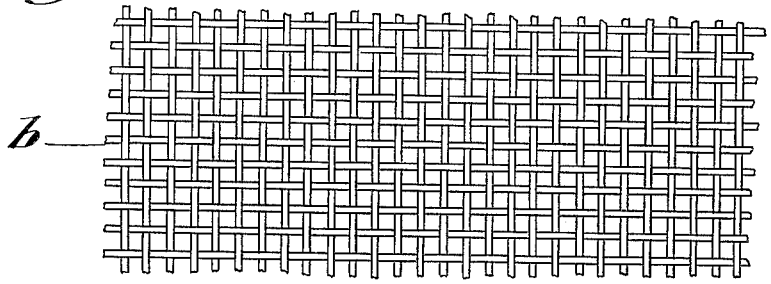

Aug. 11, 1953  H. HOLZMANN  2,648,393
PROCESS FOR THE RECOVERY OF PLATINUM
Filed Feb. 1, 1950 b a c d

INVENTOR
HERMANN HOLZMANN,

BY Bailey, Stephens & Huettig
ATTORNEYS

Patented Aug. 11, 1953

2,648,393

UNITED STATES PATENT OFFICE 2,648,393

PROCESS FOR THE RECOVERY OF PLATINUM

Hermann Holzmann, Hanau (Main), Germany, assignor to Deutsche Gold- und Silber-Scheideanstalt, vormals Roessler, Frankfurt am Main, Germany, a corporation of Germany Application February 1, 1950, Serial No. 141,700
In Switzerland February 3, 1949

5 Claims. (Cl. 183—1)

My invention relates to an improvement in the process for the recovery of platinum lost from precious metal catalysts such as they are used in methods of reacting gas mixtures by means of a precious metal catalyst.

The principal object of my invention is to recover the platinum which is used in catalytic processes, as for instance, the oxidation of ammonia and the like, whereby the platinum shows a distinct tendency to volatilize. This is accomplished according to this invention by inserting baffles in the gas flow behind the catalyst at a place with a sufficiently high temperature to bind the volatile platinum, whereby the baffles consist as a whole or partly, or at least in part of their surface of metal oxides. Practically no obstruction to the gas flow is exerted by the baffles.

It is an object of this invention to utilize baffles in the form of networks, said networks being coated with a thin layer of a noble metal.

It is a further object of this invention to fabricate networks of alloys of noble metals with base metals as baffles for the recovery of platinum.

Further objects and advantages of the present invention will be apparent from the following description, reference being made to the accompanying drawings wherein preferred embodiments of the present invention are clearly shown.

In catalytic reactions, as for instance, in the oxidation of ammonia to nitrogen oxides, carried out at temperatures of about 800° C. by means of platinum catalysts in form of networks or foils, a permanent loss of substantial quantities of platinum is involved, i. e. a loss of 6.3 g. of platinum per ton of reacted nitrogen. Evidently these losses are caused by the strong disintegration of the platinum structure which results in the formation of platinum black.

According to my observations it must be assumed that the platinum is contained in the gas flow in three different forms, i. e. in the form of platinum vapor, in the form of solid platinum particles, formed by the conversion into platinum black, and in the form of platinum oxide particles.

By inserting a mechanically acting filter, for instance, quartz wool, glass wool or metal wool, about one half of the platinum, substantially in the form of solid platinum particles may be retained. This mechanical filtering action has the disadvantage that a considerable fall of pressure occurs, which causes a decrease in the reacted quantity of ammonia.

The capability of gold to trap platinum particles at higher temperatures by welding at the point of contact, enables the construction of devices for collecting the very finely subdivided platinum particles carried forward with the gas flow whereby no mechanical filter is necessary. Instead of these mechanical filters, baffles with a thin coating of gold may be utilized. These baffles may be given a shape which allows a practically unchecked gas flow. In the hitherto known processes these baffles are mainly developed in the form of filling bodies, as for instance, porcelain rings (so-called Raschig rings) which are inserted in a thick layer immediately behind the platinum catalyst. The filling bodies are coated with a very thin layer of gold. At the prevailing high temperature the platinum particles which impinge on the Raschig rings serving as baffles immediately adhere to the gold surface. Thus it was possible to recover up to 70 percent of the lost platinum without any harmful fall of pressure. The reason why not all the lost platinum may be recovered lies in the fact that the platinum in its oxide form passes the baffles more or less freely.

It has now been found that according to the same principle as carried out in the recovery of the metallic parts by gold without the use of a mechanical filter it is possible to collect also the platinum in form of oxide. At a sufficiently high temperature the platinum oxide particles are trapped by the baffle plates with an oxide surface, obviously in the same manner as the metallic particles of platinum are welded with the metallic blank gold immediately after the impact. It is highly probable that the platinum oxide is collected by the base metal oxides in a solid solution or that the platinum undergoes a chemical combination.

Particularly favorable results were obtained with baffles in form of networks and mixtures of nickel oxides, chromium oxides and manganese oxides. Iron oxides have also proved effective. Expediently, the networks are fabricated from metals or alloys which are sufficiently stable at the physical and chemical conditions prevailing in the gas phase behind the platinum catalyst. These networks serve at the same time as support for the oxide mixtures.

Comparative experiments between gold networks and networks consisting in an alloy of the following composition (known as electric resistant material)

| | Per cent |
|---|---|
| Nickel | 74.5 |
| Chromium | 20.0 |
| Manganese | 3.5 |
| Silicium | 1.5 |
| Thorium | 0.5 | with an oxide layer formed by annealing the alloy under working conditions or before the installation, gave the following results:

TABLE I

*Recovery in percentage*

|  | Gold | Aforementioned alloy, oxide layer |
|---|---|---|
|  | *Percent* | *Percent* |
| Network No. 1 | 59.0 | 51.25 |
| Network No. 2 | 11.85 | 8.34 |
| Network No. 3 | 3.8 | 4.60 |
| Network No. 4 | 2.01 | 3.25 |
| Network No. 5 | 1.48 | 1.82 |
| Network No. 6 | 1.2 | 1.34 |
|  | 79.34 | 70.60 |

Thereby the networks are spaced with 15 mm., the first network being arranged at a distance of 50 cm. from the platinum catalyst. The network contained 3.600 meshes per sq. cm., wire gage 0.070 mm. A distinct superiority in the use of gold over the base metal alloy could be observed. The six metal networks were able to accumulate a total amount of 79.34 percent of the platinum if gold was employed, and 70.60 percent if base metals with an oxide layer were used. The conception that the pure metallic surface cannot retain any oxide particles nor the oxide surface any metallic particles of the platinum, i. e. that the recovery of platinum at the gold networks, and at the base metal networks would total at least 100 percent, has proved deceptive. In both these experiments, however, a recovery of 150 percent was obtained. This fact leads to the assumption that the gold network also retains a certain amount of the platinum oxide and that the base metal network also retains a certain amount of the metallic platinum. This can easily be declared by the fact that particles of platinum metal and platinum oxide are not distinctly separated but that there exist also particles which are composed both of platinum metal and platinum oxide. Further, the oxide layer on the base metal network is not always coherent, and therefore leads to a pure metal effect of the network surface although to a lesser degree.

It has now been found that by a combined use of metal and oxide baffles it is possible to practically recover the whole platinum carried in the gas flow. The particular combination may be carried out in numerous constructions. Thus, for instance, the networks with a gold surface and those with an oxide surface may be arranged alternately in a series connection. It has been found to be particularly advantageous if both these different net types are combined in one single network whereby it is of no consequence whether the wires with a gold surface are used as weft and those with an oxide surface are used as warp or vice versa.

The utilization of the baffles in form of networks has the further distinct advantage that the single network may be employed for a rather long time, i. e. until its saturation with platinum is completed. This is accomplished by interchanging the networks after a period of six months, for instance, by dismantling the network situated next to the platinum catalyst and adding a new network at the opposite side of the platinum catalyst. Therefore it is only necessary to dismantle the network which is completely saturated with platinum.

Figure 2:
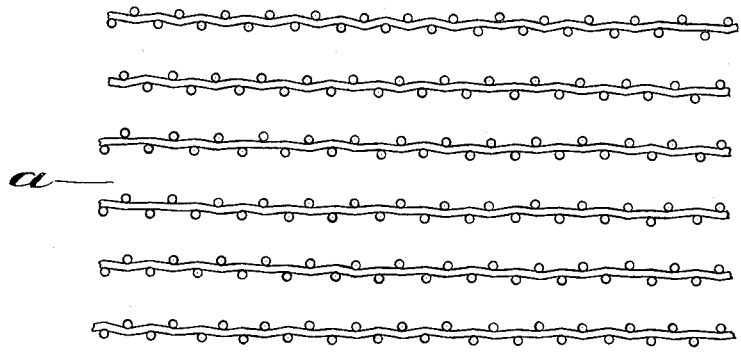
Figure 3:
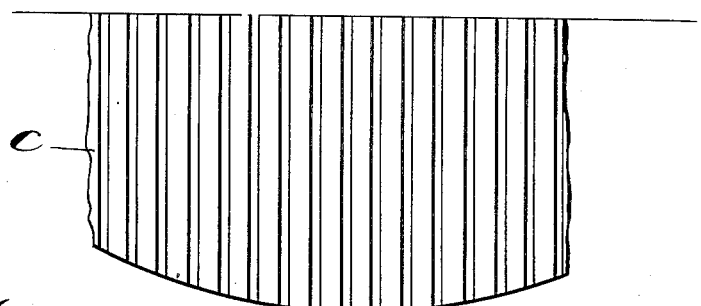
Figure 4:
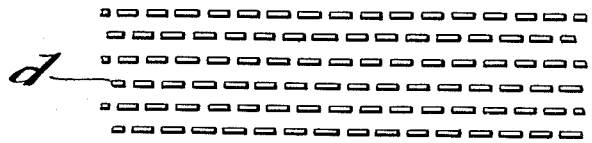

Referring to the annexed drawings:

Fig. 1 shows a top view *b* of a baffle in the form of a network according to the invention, and; Fig. 2 shows a side view *a* of a series of six superposed networks. Fig. 3 shows a top view *c* of a baffle in the form of a plurality of associated strips or foils, and; Fig. 4 shows a side view *d* of a series of baffles formed of a plurality of strips or foils.

The use of baffles having oxide and noble metal coatings in the form of networks is preferable in view of their ease of installation, simplicity of construction and gas permeability. However, other forms of baffles, for example, in the form of foils or strips such as shown in Figs. 3 and 4 can also be employed. Preferably the individual baffles in the series of baffles are staggered with respect to each other so that the gases which pass through the openings in one baffle will tend to impinge upon the surface of the next baffle. At points in the apparatus where the gases are caused to change their direction of flow, inclined baffles of simple construction can be inserted with advantage if the temperatures of the gases are sufficiently high at these points.

Networks which are only made of gold need a considerable investment of gold. Furthermore, they show an inferior stability at the occurring temperatures of about 700° C. More favorable are base metal networks with suitable heat resistant and non-scaling alloys which are coated with a gold layer. In this case, however, it is necessary to avoid the diffusion of the gold layer into the metallic support. According to my invention it is now possible to prevent such a diffusion in different ways. At first, an oxide layer on a network made of a chromium nickel alloy is produced by annealing at the open air. This oxide layer is then coated by a thin gold layer, either by cathodic atomization or by thermal evaporation in vacuo or by burning up of a so-called organic bright gold solution. Subsequently, the very thin coating thus formed may be reinforced by galvanization. The oxide layer between core and cover practically hinders the diffusion of the gold layer into the core.

A further embodiment of my invention resides in inserting a layer between the gold layer and the base metal core, said layer consisting in a metal which does not alloy with the support metal nor with the gold layer. Such a multilayer wire may, for instance, have the following composition:

Core _____ Nickel
1. Intermediate layer _____ Silver
2. Intermediate layer _____ Rhodium
Coating _____ Gold The silver does not react with nickel or with rhodium, nor the rhodium with silver or gold. Hence it follows that the gold cover remains unchanged at the respective working temperature. In proportion as the platinum accumulates on the gold and alloys with the gold, a mixture of the different layers takes place because the platinum forms mixed crystals with all components. Nevertheless, the surface of the metal always remains blank.

In the same manner as gold other noble metals, particularly silver have been found to be suited as a platinum trap. The use of silver, however, meets with difficulties because of its tendency to recrystallization and grain growth in connection with its property to dissolve oxygen. Networks made from fine silver fall to powder when used.

Thin silver coatings, however, on the support of another metal which does not form an alloy with silver like nickel or chromium-nickel, are stable. If desired, also a block layer, for instance, an oxide layer may be used. In this case other support metals may be employed. It has been found to be even more advantageous to use silver alloys instead of silver, for instance, alloys of silver with gold, palladium or platinum, either alone or in combination with each other. Excellent yields were obtained with networks consisting in wires with a nickel core and a coating made of an alloy with 80 percent of silver and 20 per cent of gold as summarized below:

TABLE II

*Recovery in percentage*

|  | Per cent |
|---|---|
| Network No. 1 | 57.90 |
| Network No. 2 | 11.26 |
| Network No. 3 | 2.64 |
| Network No. 4 | 1.70 |
| Network No. 5 | 0.88 |
| Network No. 6 | 0.76 |
|  | 75.14 |

Surprisingly, the nickel core was completely transformed into nickel oxide during the duration of test. Consequently, the oxygen diffused through the silver-gold layer right into the core. Non-scaling base metal alloys are particularly suited to the purpose also in connection with silver alloys as described. The following alloys which are non-scaling and resistant against annealing, may serve as supports with or without a coating of a noble metal:

TABLE III

| Chromium nickel steel 20/25 | Resistance alloy | Chromium nickel steel 18/8 |
|---|---|---|
| Iron, 51 percent | Iron, 64.5 percent | Iron, 74 percent. |
| Nickel, 26 percent | Chromium, 30 percent | Chromium, 18 percent. |
| Chromium, 20 percent | Aluminum, 5 percent | Nickel, 8 percent. |
| Manganese, 2 percent | Thorium, 0.5 percent |  |
| Silicium, 1 percent |  |  |

It is even possible to catch platinum metal particles and platinum oxide particles by baffles which do not consist entirely of oxides or of a blank noble metal or which do not have a respective coherent oxide layer. On these surfaces the metal effect and the oxide effect occurs simultaneously. For this purpose alloys of silver with copper or another base metal have been found to be advantageous.

The deposit may also be increased if the baffle, for instance, the network, is electrostatically charged or earthed, as it has been found that the yield in the recovered platinum may be further improved by the action.

It is desirable to place the baffles directly in the reaction chamber in order to catch most of the catalyst metal.

While I have described my invention in particular reference to the oxidation of ammonia to oxides of nitrogen it is evident that my invention also applies to the recovery of platinum lost from platinum metal catalysts used in the reacting of other gas mixtures and the conversion of gases other than ammonia provided the platinum catalyst is operated at elevated temperatures.

As many apparently widely different embodiments of my invention may be made without departing from the spirit and scope thereof, it is to be understood that I do not limit myself to the specific embodiments thereof except as defined in the appended patent claims.

I claim:

1. A method for collecting platinum contained in a highly heated gas stream leaving a platinum catalyst which comprises passing such gases over baffles exerting substantially no obstruction to the flow of the gas stream, and having a core comprising at least one metal having an atomic number from 24 to 28, inclusive, and having a surface comprising at least one metal oxide of a metal having an atomic number from 24 to 29, inclusive, and over baffles exerting substantially no obstruction to the flow of the gas stream, and having a core comprising at least one metal having an atomic number from 24 to 28, inclusive, and having a surface comprising at least one noble metal of the group consisting of palladium, platinum, gold and silver.

2. A method for collecting platinum contained in a highly heated gas stream leaving a platinum catalyst which comprises passing such gases over baffles exerting substantially no obstruction to the flow of the gas stream, and having a core comprising at least one metal having an atomic number from 24 to 28, inclusive, and having a surface comprising at least one metal oxide of a metal having an atomic number from 24 to 29, inclusive, and over baffles exerting substantially no obstruction to the flow of the gas stream, and having a core comprising at least one metal having an atomic number from 24 to 28, inclusive, and having a surface comprising gold.

3. A method for collecting platinum contained in a highly heated gas stream leaving a platinum catalyst which comprises passing such gases over baffles exerting substantially no obstruction to the flow of the gas stream, and having a core comprising at least one metal having an atomic number from 24 to 28, inclusive, and having a surface comprising at least one metal oxide of a metal having an atomic number from 24 to 29, inclusive, and over baffles exerting substantially no obstruction to the flow of the gas stream, and having a core comprising at least one metal having an atomic number from 24 to 28, inclusive, and having a surface comprising silver.

4. A method for collecting platinum contained in a highly heated gas stream leaving a platinum catalyst which comprises passing such gases over baffles exerting substantially no obstruction to the flow of the gas stream, and having a core comprising at least one metal having an atomic number from 24 to 28, inclusive, and having a surface comprising at least one metal oxide of a metal having an atomic number from 24 to 29, inclusive, and over baffles exerting substantially no obstruction to the flow of the gas stream, and having a core comprising at least one metal having an atomic number from 24 to 28, inclusive, and having a surface comprising gold and silver alloy.

5. A method for collecting platinum contained in a highly heated gas stream leaving a platinum catalyst which comprises passing such gases over baffles exerting substantially no obstruction to the flow of the gas stream, and having a core comprising at least one metal having an atomic number from 24 to 28, inclusive, and having a surface comprising silver and copper oxide.

HERMANN HOLZMANN.

References Cited in the file of this patent

UNITED STATES PATENTS

| Number | Name | Date |
|---|---|---|
| 2,226,113 | Chastain | Dec. 24, 1940 |
| 2,226,149 | Zimmermann | Dec. 24, 1940 |